(12) United States Patent
Rack

(10) Patent No.: US 6,782,781 B2
(45) Date of Patent: Aug. 31, 2004

(54) SAW BLADE FOR RECIPROCATING SAW APPARATUS

(75) Inventor: Allan A. Rack, Alsea, OR (US)

(73) Assignee: Scandus Trading Company, LLC, Alsea, OR (US)

( * ) Notice: Subject to any disclaimer, the term of this patent is extended or adjusted under 35 U.S.C. 154(b) by 64 days.

(21) Appl. No.: 10/198,436

(22) Filed: Jul. 16, 2002

(65) Prior Publication Data

US 2003/0014869 A1 Jan. 23, 2003

Related U.S. Application Data

(60) Provisional application No. 60/307,279, filed on Jul. 23, 2001.

(51) Int. Cl.[7] .............................................. B23D 57/00
(52) U.S. Cl. ................. 83/13; 30/392; 83/835
(58) Field of Search ........................ 83/835, 847, 852, 83/854; 30/355, 392–394

(56) References Cited

U.S. PATENT DOCUMENTS

| 522,749 A | 7/1894 | Bedell |
| 709,857 A | 9/1902 | Anderson |
| 770,094 A | 9/1904 | McGill |
| 942,920 A | 12/1909 | Martin |
| 3,033,251 A | 5/1962 | Atkinson et al. |
| 3,477,479 A | 9/1969 | Doty |
| 3,977,289 A | 8/1976 | Tuke |
| 4,188,952 A | 2/1980 | Loschilov et al. |
| 5,517,889 A | 5/1996 | Logan |
| 5,901,451 A | 5/1999 | Nakayama |
| D427,865 S | 7/2000 | Mills, Jr. |
| 6,401,585 B1 | 6/2002 | Morgan |
| 2003/0010179 A1 * | 1/2003 | McLuen ...................... 83/848 |

* cited by examiner

Primary Examiner—Douglas D. Watts
(74) Attorney, Agent, or Firm—Lori M. Friedman

(57) ABSTRACT

A saw blade for a reciprocating saw apparatus having first and second longitudinal edges and first and second opposite ends. The saw blade is provided at its first end with an attachment element for attaching the blade to a power unit. The first and second longitudinal edges of the blade are toothed, the teeth of the first and second longitudinal edges being raked towards the first end of the saw blade. The second end of the blade is toothed and is rounded.

23 Claims, 4 Drawing Sheets

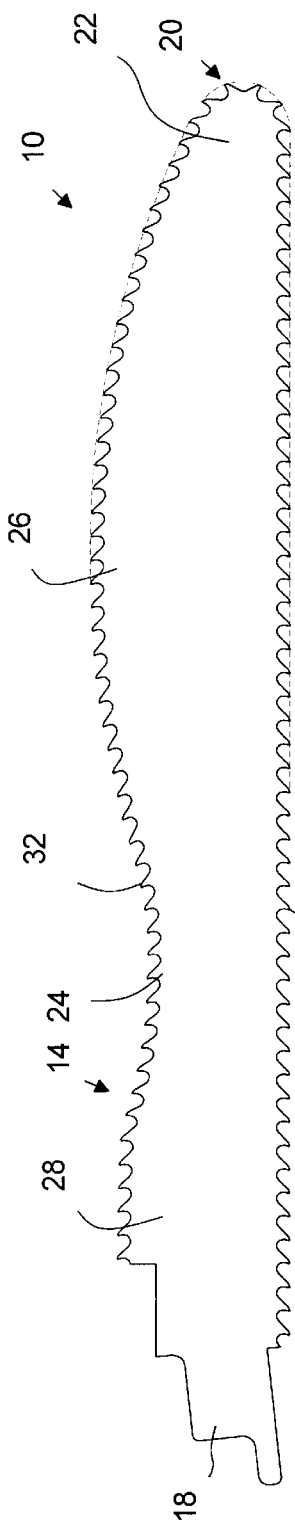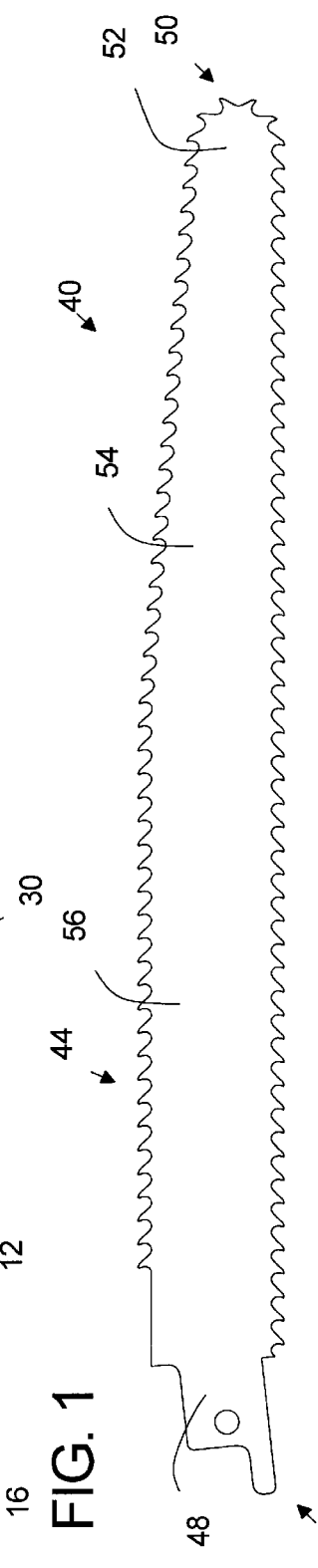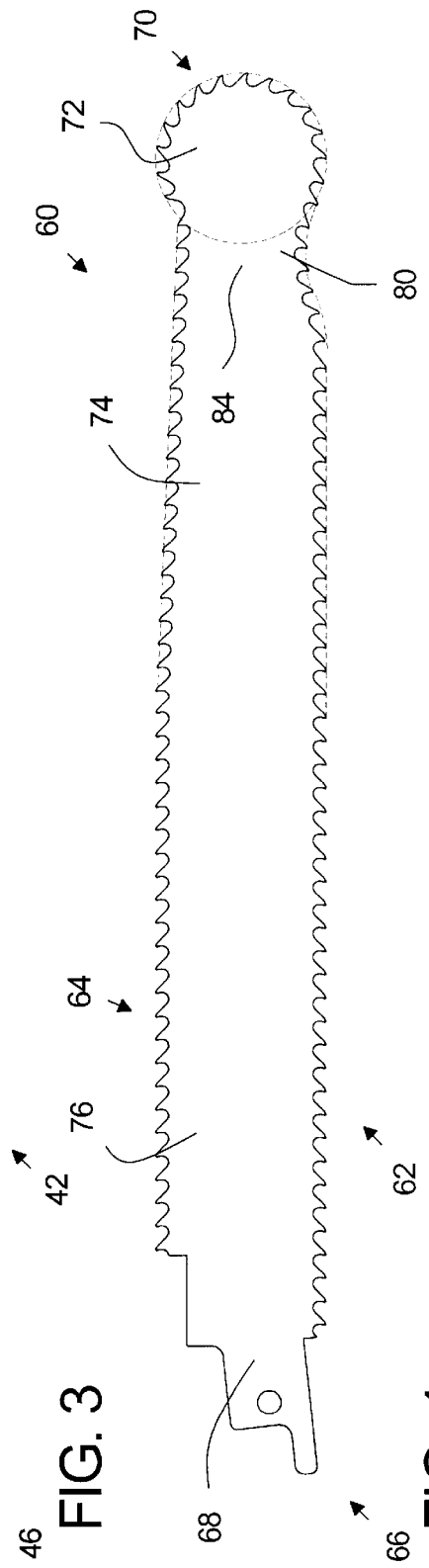

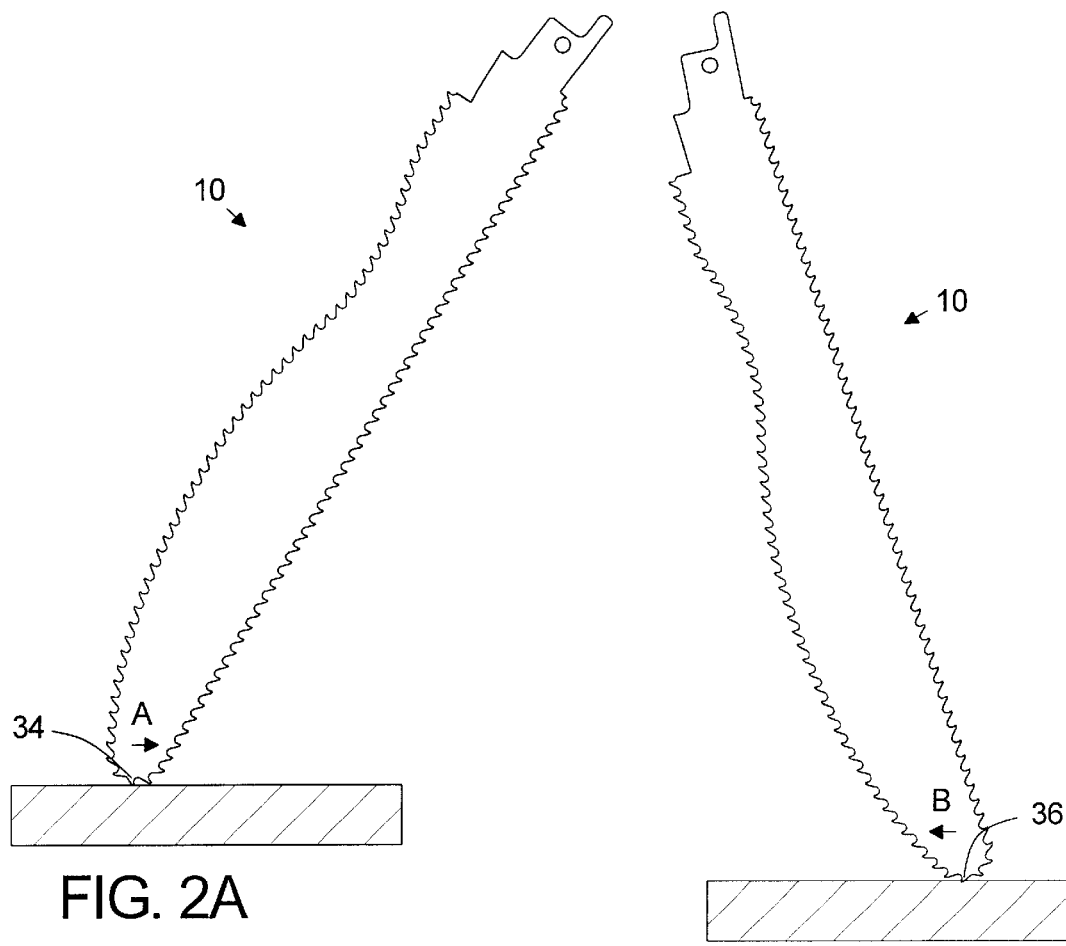
FIG. 2A
FIG. 2B
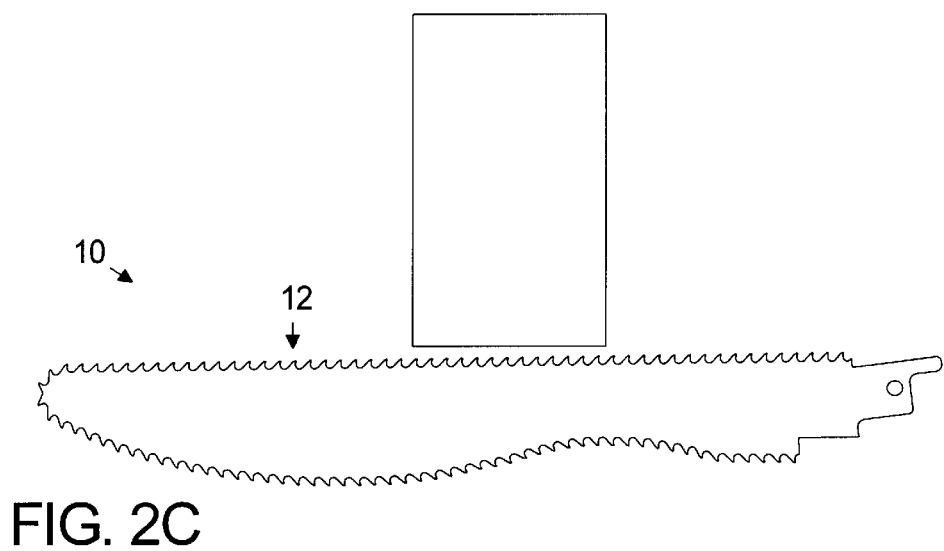
FIG. 2C

US 6,782,781 B2

SAW BLADE FOR RECIPROCATING SAW APPARATUS

CROSS-REFERENCE TO RELATED APPLICATION

This application claims benefit of U.S. Provisional Application No. 60/307,279 filed Jul. 23, 2001, the entire disclosure of which is hereby incorporated by reference herein for all purposes.

BACKGROUND OF THE INVENTION

This invention relates to a saw blade for a reciprocating saw apparatus.

A conventional reciprocating saw apparatus comprises a power unit having a housing that contains a motor and a transmission that converts rotary movement of the output shaft of the motor to reciprocating linear movement of an output member of the saw apparatus. The apparatus further includes a saw blade removably attached to the output member.

The saw blade of a conventional reciprocating saw apparatus typically has two edges, one of which is toothed. At one end, the blade is provided with a tang or other attachment element for securing the blade to the output member of the power unit. At its other end, the blade has a transverse edge that is inclined relative to the longitudinal edges and meets the toothed longitudinal edge at a point.

A common use of a reciprocating saw apparatus is to cut a panel of, e.g. plywood, under circumstances in which the edge of the panel is not readily accessible, such that a circular saw could be brought to bear. The user will normally drill a pilot hole in the panel and insert the blade into the hole and then cut the panel by forcing the blade along a desired path. If the pilot hole is initially too small to receive the blade, the user can start the cut by inserting the point of the blade into the hole.

It is not always convenient to drill a pilot hole in a panel in order to bring a reciprocating saw apparatus to bear on the panel. For example, a drill might not be easily accessible, or it might be necessary to swap plugs between the drill and the reciprocating saw apparatus if a power cord has only one available socket. Nevertheless, it is sometimes very difficult or impossible to start the cut using a conventional blade without a pilot hole.

The conventional saw blade is limited by virtue of its shape with regard to the cutting techniques that it will support.

SUMMARY OF THE INVENTION

In accordance with a first aspect of the invention there is provided a saw blade for a reciprocating saw apparatus, said saw blade having first and second longitudinal edges and first and second opposite ends, wherein the saw blade is provided at its first end with an attachment element for attaching the blade to a power unit, the first and second longitudinal edges of the blade are toothed, the teeth of the first and second longitudinal edges are raked towards the first end of the saw blade, and the second end of the blade is toothed and is rounded.

In accordance with a second aspect of the invention there is provided a reciprocating saw apparatus comprising a power unit having a housing and an output member, and a saw blade having first and second longitudinal edges and first and second opposite ends, the saw blade being attached at its first end to the output member of the power unit and being toothed at its first and second longitudinal edges, the teeth of the first and second longitudinal edges being raked towards the first end of the saw blade, and the second end of the blade being toothed and rounded.

BRIEF DESCRIPTION OF THE DRAWINGS

For a better understanding of the invention, and to show how the same may be carried into effect, reference will now be made, by way of example, to the accompanying drawings, in which FIG. 1 is a side view of a first saw blade embodying the present invention, FIGS. 2A–2G illustrate use of the saw blade shown in FIG. 1 in various conditions, FIG. 3 is a side view of a second saw blade embodying the present invention, FIG. 4 is a side view of a third saw blade embodying the present invention.

DETAILED DESCRIPTION

Figure 2D:
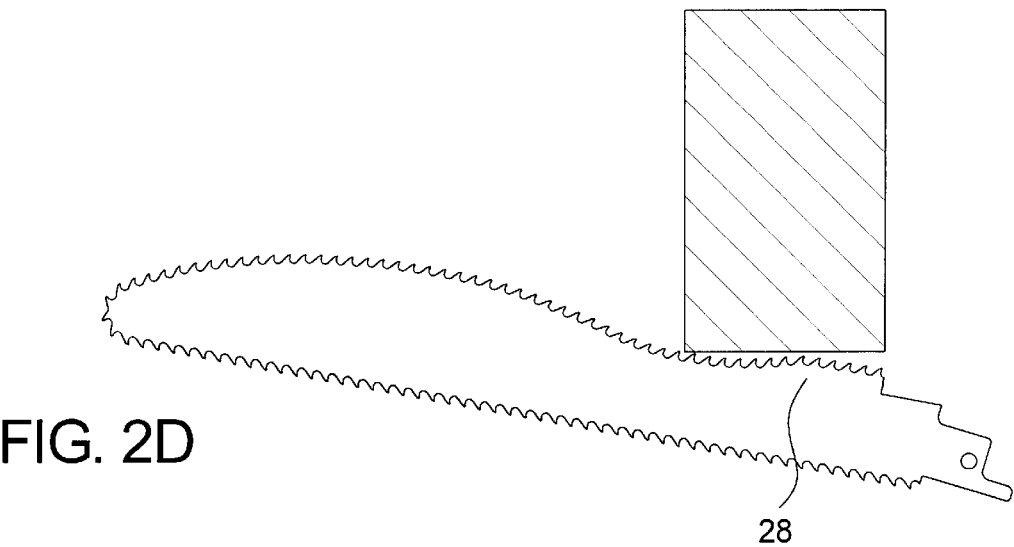

With reference to FIG. 1, the first saw blade 10 has a lower toothed blade edge 12 and an upper toothed blade edge 14. A back end 16 of the blade 10 has a fastening mechanism 18 for attachment to a power unit, which may be a conventional reciprocating saw power unit having an output member that reciprocates linearly relative to a housing. A front end 20 of the saw blade has a tip 22 that is rounded and toothed. The overall configuration of the lower and upper edges 12 and 14 of the blade 10 and the rounded tip 22 can be defined by reference to the line on which the tips of the teeth lie. The lower edge 12 of the blade is rectilinear and the upper edge 14 of the blade has a curvilinear configuration and includes a forward convex portion 26, an intermediate concave portion 24 and a rear convex portion 28. It will be seen from the dashed lines in FIG. 1 that the lower edge of the blade is tangential to the rounded tip 22 and that the forward convex portion 26 and the rounded tip 22 meet without a substantial discontinuity in curvature. The concave portion 24 meets the convex portions 26 and 28 without a substantial discontinuity in curvature. The teeth 30 of the edge 12 and the teeth 32 of the edge 14 are raked slightly towards the back end 16.

The two sets of teeth, on the lower and upper edges respectively, meet on the tip 22 at a notch, and the notch is located at the extreme forward end of the saw blade.

The two sets of teeth have the same pitch and depth and their operating characteristics are substantially equal, except for variations that might arise due to manufacturing processes. In the illustrated embodiment of the invention the setting pattern of the teeth on the upper edge of the blade is the same as the setting pattern of the teeth on the lower edge of the blade, although the setting patterns on the two edges of the blade may be different in other embodiments.

FIG. 2A shows the blade 10 being used to cut into a panel and it will be evident from the location and orientation of the tooth 34 that this tooth is able to erode the panel when the blade is pulled in the direction of the arrow A even though the blade is at a steep orientation relative to the panel. This enables the blade to penetrate the panel without using a drill to cut a pilot hole. FIG. 2B shows that when the saw blade is reversed, the tooth 36 is able to erode the panel when the blade is pulled in the direction of the arrow B and the blade is at an even steeper orientation. Of course, the tooth 34 (FIG. 2A) or 36 (FIG. 2B) is not responsible for all the cutting action, and FIGS. 2A and 2B are merely intended to show that the teeth are suitably positioned and oriented for eroding the panel when the blade is at a relatively steep orientation to the panel. Further, in another embodiment of the invention the teeth on the rounded tip may be smaller and more closely spaced, so that multiple teeth contact the panel when the tip of the saw blade is first brought into contact with the panel.

For ease of comparison, the following examples illustrate cutting a horizontal workpiece surface from below. However, it will be appreciated that in practice the workpiece surface will not always be horizontal and that it might not be cut from below.

Figure 2E:
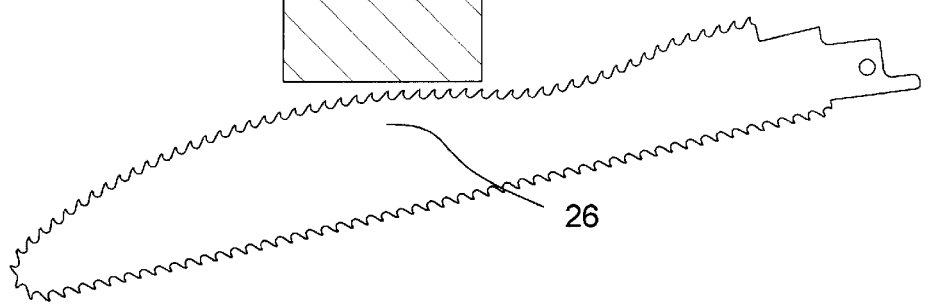
Figure 2F:
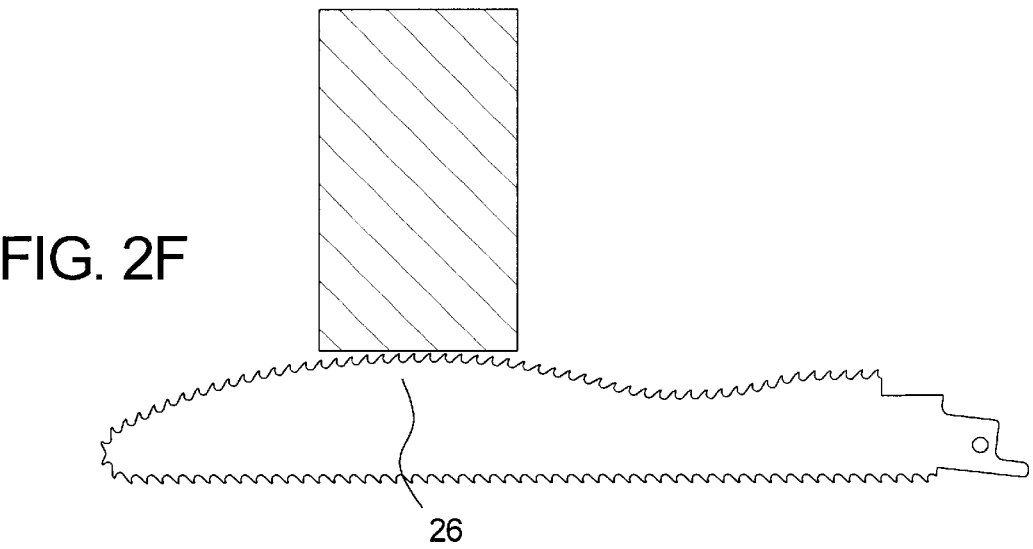
Figure 2G:
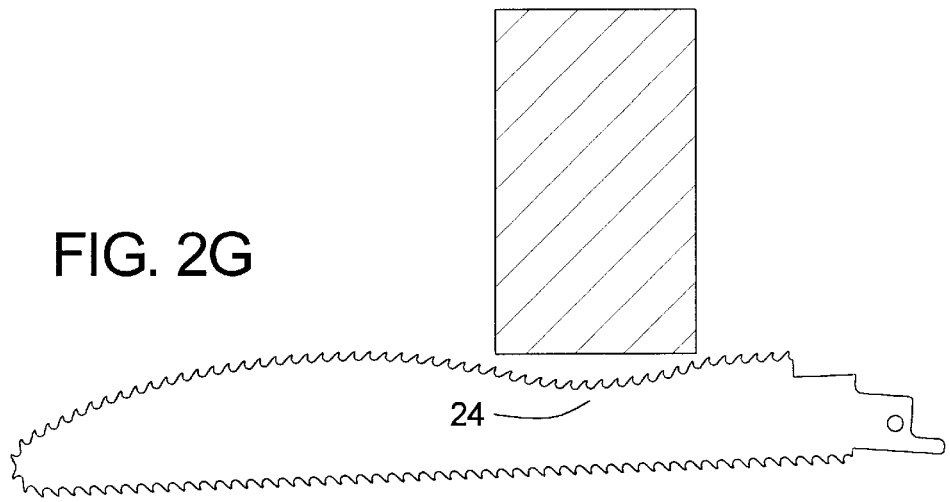

In the case of FIG. 2C, the workpiece is cut using the blade edge 12 and for maximum cutting efficiency this requires that the power unit be oriented so that the blade edge 12 is horizontal. Referring to FIGS. 2D–2F, the convex portions 26, 28 of the blade edge 14 allow a range of different orientations of the power unit while still achieving high cutting efficiency. Referring to FIG. 2G, the concave portion 24 of the blade edge 14 assists in locating the blade before a cut has been made and therefore makes it easier to start a cut.

With reference to FIG. 3, the second saw blade 40 has a lower toothed blade edge 42 and an upper toothed blade edge 44. The lower edge 42 is rectilinear but it may alternatively have a slightly convex shape. The back end 46 of the saw blade 40 has a fastening mechanism 48 similar to the fastening mechanism 18 of the blade 10. The front end 50 of the saw blade 40 has a tip 52 that is rounded and toothed.

The upper edge 44 of the blade 40 has a forward portion 54 that is inclined slightly to the lower edge 42 and a rear portion 56 that is parallel to the lower edge 42. Accordingly, the blade 40 becomes progressively narrower over about half the length of the blade towards the tip 52. This feature allows use of the blade 40 in a more confined space where it might not be possible to use the blade 10 shown in FIG. 1 without damaging objects in the vicinity of the workpiece. The rounded tip 52 of the blade shown in FIG. 3 offers the advantages described with reference to FIGS. 2A and 2B. Because the forward portion 54 the upper blade edge is inclined relative to the rear portion 56, different orientations of the saw blade relative to the workpiece for optimum cutting efficiency are permitted.

With reference to FIG. 4, the third saw blade 60 has a lower toothed blade edge 62 and an upper toothed blade edge 64. A back end 66 of the blade 60 has a fastening mechanism 68 similar to the fastening mechanism 18 of the blade 10. The front end 70 has a tip 72 that is rounded and toothed. The upper edge 64 has two rectilinear portions 74, 76. The tip 72 is joined to the lower edge 62 by a concave portion 80. The tip 72 includes a part-circular portion with a narrow neck 84. The relieving of the blade 60 both at the lower edge and at the upper edge facilitates starting a cut both when the blade is moving downwards and when it is moving upwards.

FIG. 4 shows the teeth on the rounded tip 72 raked towards the lower edge 62. However, it is in fact preferred that the raking of the teeth should change direction at the extreme forward end of the saw blade, as shown in FIGS. 1 and 3.

Figure 5:
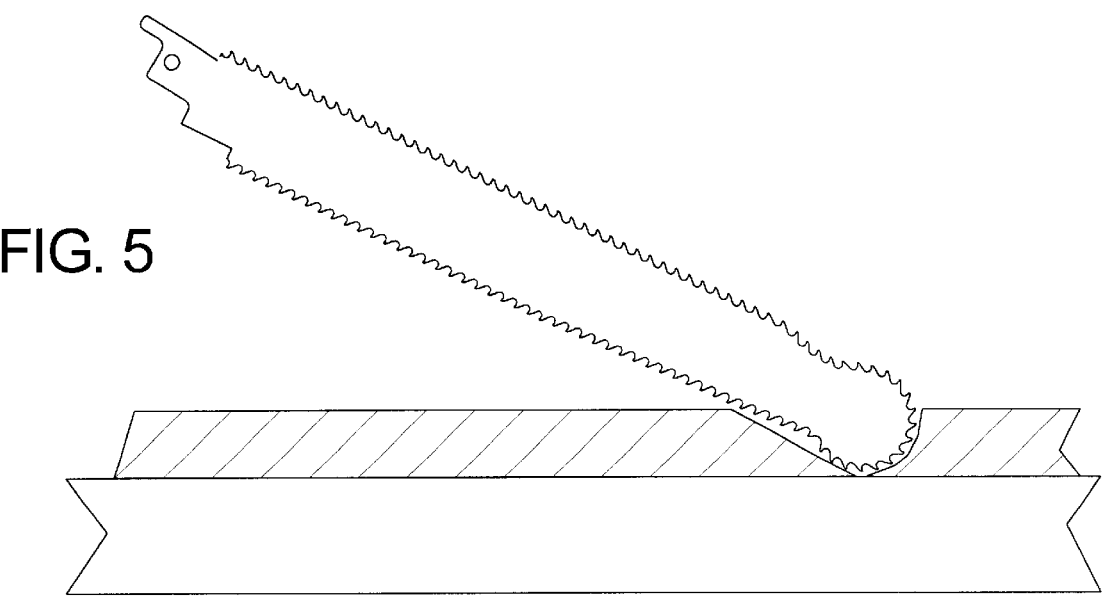
FIG. 5 illustrates use of the saw blade shown in FIG. 4.

As shown in FIG. 5, the part circular portion of the tip provides a visual gauge for observing depth of cut, which may be useful for example, when it is desired to cut through a plywood panel resting on an underlayment without penetrating the underlayment. The raked teeth on the part circular portion of the tip are able to erode the plywood panel and the operator can visually observe, by reference to the configuration of the part circular portion, the depth to which the blade penetrates the plywood panel.

In operation, the saw blades described above have common features. For simplicity, the saw blade 10 attached to a reciprocal saw is used for illustration. The blade 10 does not need any predrilling of a pilot hole to start the cutting of a workpiece such as a plywood panel. The operator simply applies the rounded tip 20 of the saw blade 10 to the surface of the wood piece until an opening has been created by the rounded tip 22. The blade 10 may then be inserted into the opening to apply the edge 12 or 14 to the workpiece for cutting the panel. It should be noted that when the blade 10 is positioned in the opening with the lower edge downwards, the operator may cut both downwards with the edge 12 by forcing the blade 10 downwards or upwards with the edge 14 by forcing the blade 10 upwards without its being necessary to remove the blade from the cut. The raking of the teeth on each edge towards the back end of the blade ensures that the feel of the operation is similar both when cutting upwards and when cutting downwards. The fact that the saw blade may be used to cut both upwards and downwards and the rounded tip make it possible to operate a reciprocating saw power unit equipped with the blade in very confined spaces, at awkward angles and in very unusual work positions. In this way, the features of the blade add to the versatility, usefulness and handling of a reciprocating saw power unit equipped with the blade. There is no need to leave the place of operation to change the blade since the blade has the important functions of cutting both in the upward and downward direction as well as in the forward direction if it is necessary to make a pilot hole in the panel. The versatility of the blade should also increase the product life and reduce the risk of undesirable blade bending and blade breakage.

The illustrated saw blades are advantageous relative to conventional blades for reciprocating saws and allow a range of different sawing techniques that are not supported by conventional blades. For example, the blade shown in FIG. 4 allows the user to saw a workpiece that is behind a panel without cutting as large a hole in the panel as might otherwise be necessary.

It will be appreciated that the invention is not restricted to the particular embodiment that has been described, and that variations may be made therein without departing from the scope of the invention as defined in the appended claims and equivalents thereof. For example, although in each embodiment described with reference to the drawings, the two sets of teeth meet on the rounded tip of the blade at a notch, they may instead meet at a tooth. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A saw blade for a reciprocating saw apparatus, said saw blade having first and second longitudinal edges and first and second opposite ends, wherein the saw blade is provided at its first end with an attachment element for attaching the blade to a power unit, the first and second longitudinal edges of the blade are toothed, the teeth of the first and second longitudinal edges are raked towards the first end of the saw blade, and the second end of the blade is toothed and is rounded, said rounded end having a smooth, continuous, substantially circular contour tangent to both said first and second longitudinal edges with no substantial discontinuity in curvature.

2. A saw blade according to claim 1, wherein the first longitudinal edge of the blade is substantially straight.

3. A saw blade according to claim 1, wherein the first longitudinal edge of the blade includes a concave length segment.

4. A saw blade according to claim 1, wherein the first longitudinal edge of the blade includes a convex length segment.

5. A saw blade according to claim 1, wherein the first and second longitudinal edges of the blade each include a concave length segment.

6. A saw blade according to claim 1, wherein the number of teeth per unit length of the rounded second end of the blade is substantially equal to the number of teeth per unit length of the first longitudinal edge of the blade.

7. A saw blade according to claim 1, wherein the first and second longitudinal edges are of different respective geometrical configurations.

8. A reciprocating saw apparatus comprising:

a power unit having a housing and an output member, and a saw blade having first and second longitudinal edges and first and second opposite ends, the saw blade being attached at its first end to the output member of the power unit and being toothed at its first and second longitudinal edges, the teeth of the first and second longitudinal edges being raked towards the first end of the saw blade, and the second end of the blade being toothed and rounded the rounded end having a smooth continuous substantially circular contour tangent to both said first and second longitudinal edges with no substantial discontinuity in curvature.

9. Apparatus according to claim 8, wherein the first longitudinal edge of the blade is substantially straight.

10. Apparatus according to claim 8, wherein the first longitudinal edge of the blade includes a concave length segment.

11. Apparatus according to claim 8, wherein the first longitudinal edge of the blade includes a convex length segment.

12. Apparatus according to claim 8, wherein the first and second longitudinal edges of the blade each include a concave length segment.

13. Apparatus according to claim 8, wherein the number of teeth per unit length of the rounded second end of the blade is substantially equal to the number of teeth per unit length of the first longitudinal edge of the blade.

14. Apparatus according to claim 8, wherein the first and second longitudinal edges are of different respective geometrical configurations.

15. A saw blade according to claim 1, wherein the teeth on the rounded tip are small and closely spaced, so that multiple teeth contact a surface to be cut when the tip of the saw blade is first brought into contact with the surface.

16. A saw blade according to claim 1, wherein two proximate teeth of said rounded second end of the blade have opposite rake, and said two teeth having opposite rake are separated by a substantially symmetric notch.

17. A saw blade according to claim 1, wherein two proximate toothed portions of said rounded second end of the blade have opposite rake, and said two proximate teethed portions having opposite rake meet at a tooth having no rake.

18. A saw blade according to claim 1 wherein said saw blade has a longitudinal midpoint wherein the curve of the blade at said mid point is concave and which gradually and progressively become convex at both of the two ends of said saw blade.

19. A method of using a reciprocating saw to cut a surface without the need to access an edge of said surface by attaching a blade with a rounded tip to a power unit comprising the steps of a) providing a power unit having a housing and an output member;

b) attaching a saw blade having two longitudinal edges which are (toothed) the teeth of the first and second longitudinal edges are raked towards the first end of the saw blade, and the second end of the blade is toothed and is attached and rounded the rounded end having a smooth continuous substantially circular contour tangent to both said first and second longitudinal edges with no substantial discontinuity in curvature, c) applying the rounded tip of the blade to the surface to be cut whereby the need to pre-cut a pilot hole is avoided;

d) operating the saw whereby the circular portion of the tip continuously provides a visual gauge by which a user can observe depth of cut being made;

e) continuing the cutting operation in more than one direction without the need to reposition the saw.

20. The method of claim 19 wherein the rounded tip of the blade increases the product life of the saw blade and reduces the risk of undesirable blade bending and blade breakage.

21. The method of claim 19 wherein the teeth are suitably positioned and oriented for eroding the surface when the blade is at a relatively steep orientation to the surface.

22. The method of claim 19 wherein the user is enabled to cut both downwards by forcing the saw blade downwards and upwards by forcing the blade upwards without removing the blade from the surface being cut due to the raking of the teeth on each edge that ensures that the operation is similar when cutting is in either direction.

23. The method of claim 22 wherein the saw blade cutting both upwards and downwards is made possible by the rounded tip which enables operation of the saw blade in very confined spaces, at awkward angles, and in very unusual positions.

* * * * *